US010909780B2

(12) United States Patent
Doriski et al.

(10) Patent No.: US 10,909,780 B2
(45) Date of Patent: Feb. 2, 2021

(54) METHODS AND SYSTEMS FOR OPERATING AIRCRAFT WITH MODIFIED FLIGHT PERFORMANCE CHARACTERISTICS

(71) Applicant: L-3 Communications Integrated Systems L.P., Greenville, TX (US)

(72) Inventors: Alexander W. Doriski, Commerce, TX (US); Justin L. Druckemiller, Royse City, TX (US); Clinton G. Logwood, II, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 219 days.

(21) Appl. No.: 15/966,868

(22) Filed: Apr. 30, 2018

(65) Prior Publication Data
US 2019/0333295 A1 Oct. 31, 2019

(51) Int. Cl.
*G07C 5/08* (2006.01)
*B64D 27/10* (2006.01)

(52) U.S. Cl.
CPC .......... *G07C 5/0808* (2013.01); *B64D 27/10* (2013.01); *G07C 5/085* (2013.01); *G07C 5/0825* (2013.01)

(58) Field of Classification Search
CPC .................................................. G07C 5/0808
See application file for complete search history.

(56) References Cited

U.S. PATENT DOCUMENTS

| | | | |
|---|---|---|---|
| 9,669,927 B2 | 6/2017 | Hodge et al. | |
| 9,676,482 B2 | 6/2017 | Hodge et al. | |
| 10,071,818 B2 * | 9/2018 | Kim | G06F 16/23 |
| 10,345,824 B2 * | 7/2019 | Kim | G05D 1/046 |
| 10,490,090 B2 * | 11/2019 | Quiroz-Hernandez | G01C 21/20 |
| 10,592,636 B2 * | 3/2020 | Ren | G06F 30/20 |

* cited by examiner

*Primary Examiner* — Michael A Berns
(74) *Attorney, Agent, or Firm* — Egan Peterman Enders Huston

(57) ABSTRACT

Methods and systems are disclosed to operate an aircraft with modified (e.g., improved) flight performance characteristics, such as increased or maximized aircraft takeoff weight and/or longer allowable mission time for the aircraft. In one example, the aircraft may be enabled to operate with increased aircraft engine performance (e.g., such as engine power) without increasing engine temperature above the maximum allowable operating temperature limits for the engine. In a further example, available engine power may be determined during a pre-flight sequence, and utilized by an aircraft without exceeding published or manufacturer specified engine temperature limits.

25 Claims, 10 Drawing Sheets

METHODS AND SYSTEMS FOR OPERATING AIRCRAFT WITH MODIFIED FLIGHT PERFORMANCE CHARACTERISTICS

This invention was made with United States Government support under Contract No. FA8620-11-G-4026 Order #1534, Contract No. FA8620-11-G-4025 Order #1621, and Contract No. FA8620-16-G-3027 Order # FA8620-17-F-4821 awarded by the United States Air Force. The Government has certain rights in this invention.

FIELD

The present invention relates to aircraft, and more particularly to aircraft flight operations.

BACKGROUND

Engine power and thrust ratings for turboprop aircraft are required to meet "minimum specifications" in accordance with 14 CFR § 33.8. This requires an aircraft manufacturer to generate aircraft performance data based on engine data that is far below the capabilities that would actually be seen in typical operations, particularly military operations where aircraft are well-maintained. As a result, maximum allowable takeoff weights presented to meet FAA climb requirements are far below what a typical aircraft would be capable of if manufacturers were allowed to account for the additional engine power that is known to be present. During military operations, these lower takeoff weights result in significantly reduced mission times as not as much fuel can be loaded onboard, since other mission payload weights are fixed.

FIG. 1 illustrates a conventional single linear relationship that is used to relate normalized rate of climb (Ciw) and normalized shaft horsepower (Piw) for a green (i.e., unmodified) Beechcraft King Air 350i (B300) type aircraft. The conventional relationship of FIG. 1 is generated by calculating Piw and Ciw for the unmodified aircraft using climb performance data found in the original equipment manufacturer (OEM) airplane flight manual (AFM). The conventional linear plot of (Ciw) and (Piw) data is normalized based on atmospheric parameters such as air density and outside air temperature, but does not fully account for altitude and weight variations in the test data. Moreover, the single plotted AFM line of FIG. 1 is only an approximation of the actual OEM AFM data, the individual points of which are scattered and may fall above and/or below the line of FIG. 1. This may be seen by the plotted AFM data points relative to the fitted curve given by the relationship: y=1.1099x−576.67, with coefficient of determination of $R^2$=0.9948.

It is known to obtain additional engine power by increasing engine temperature temporarily during an aircraft climb sequence. Specifically, in some cases when one engine of a multi-engine aircraft fails during aircraft takeoff, the maximum allowable operating temperature limits for the remaining operating engine/s must be exceeded to meet climb power requirements. However, this may result in permanent damage to the operating engine/s.

SUMMARY

Disclosed herein are methods and systems that may be implemented to operate an aircraft with modified (e.g., improved) flight performance characteristics, such as increased or maximized aircraft takeoff weight, increased climb gradient and/or longer allowable mission time for the aircraft. Using the disclosed methods and systems, existing engine performance of an aircraft may be maximized without damaging the aircraft engine/s and without requiring modification to the engine hardware. Examples of aircraft types with which the disclosed methods and systems may be implemented include, but are not limited to, a fixed-wing aircraft with single turboprop or with multiple turboprop engines (e.g., two or more of such engines).

In one exemplary embodiment, the disclosed methods and systems may be implemented to operate an aircraft with increased aircraft engine performance (e.g., such as engine power) without increasing engine temperature above the maximum allowable operating temperature limits for the engine, and thus without incurring permanent damage to the engine that typically accompanies operation above the maximum allowable operating temperature limit. In a further exemplary embodiment, the disclosed methods and systems may be implemented to determine available engine power that may be utilized by an aircraft without exceeding published engine temperature limits (e.g., temperature limits published by the manufacturer (OEM) in the airplane flight manual or aircraft maintenance manual). In this regard, the available engine power may be determined, for example, during a pre-flight sequence for the aircraft or at any other suitable time.

In one exemplary embodiment, the disclosed methods and systems may be implemented to transform airplane flight manual climb data and flight test data into a coordinate space for a given aircraft and engine configuration that includes normalized shaft horsepower (Piw), normalized rate of climb (Ciw), aircraft weight (A), outside air temperature (B), altitude, and climb segment. This coordinate space may be used to create a topological map in multi-dimensional space (i.e., that is in a space greater than three dimensions) that in one embodiment may contain all the information needed to construct a full set of performance charts for any given engine power available expressed relative to the airplane flight manual static torque chart. The amount of engine power developed during the pre-takeoff engine checks dictates to the pilot which set of performance charts to use. By using performance charts based on the maximum power available, the aircraft fuel weight, and subsequent mission times, is greatly increased.

In one respect, disclosed herein is a method, including: flight testing a modified fixed wing aircraft under multiple different flight conditions, the aircraft having one or more aircraft engines propelling the aircraft through the air, and the multiple different flight conditions including at least one of multiple different gross weights, multiple different operating altitudes, multiple different operating air temperatures, or combinations thereof; recording flight test data during the flight testing of the modified aircraft, the recorded flight test data including measured rate of climb and corresponding aircraft engine power at each of the multiple different flight conditions; generating a relationship between rate of climb and aircraft engine power at multiple different altitudes for the modified aircraft based on the recorded flight test data; and generating a relationship between values of climb performance gradient and air temperature for the modified aircraft at the multiple different altitudes.

In another respect, disclosed herein is a system, including non-volatile memory storing: data including a relationship between values of climb performance gradient and air temperature for an unmodified fixed wing aircraft at multiple different altitudes, and data including measured rate of climb and corresponding aircraft engine power at each of multiple different flight conditions for a modified aircraft, where the modified aircraft is a modified version of the unmodified aircraft and where the flight conditions includes at least one of multiple different gross weights, multiple different operating altitudes, multiple different operating air temperatures, or combinations thereof. The system may also include at least one processing device coupled to the non-volatile memory and programmed to: read from the non-volatile memory and convert the data including a relationship between values of climb performance gradient and air temperature for an unmodified aircraft at multiple different altitudes to a relationship between rate of climb and aircraft engine power at multiple different altitudes for the unmodified aircraft; read from the non-volatile memory the data including measured rate of climb and corresponding aircraft engine power at each of multiple different flight conditions for a modified aircraft; generate a relationship between rate of climb and aircraft engine power at different altitudes for the modified aircraft based on the measured rate of climb and corresponding aircraft engine power at each of multiple different flight conditions for the modified aircraft; generate a relationship between values of climb performance gradient and air temperature for the modified aircraft at the multiple different altitudes from the generated relationship between rate of climb and aircraft engine power at different altitudes for the modified aircraft; and output the generated relationship between values of climb performance gradient and air temperature for the modified aircraft at the multiple different altitudes to at least one of a display device, the non-volatile memory or to a hard copy format.

DESCRIPTION OF ILLUSTRATIVE EMBODIMENTS

Figure 1:
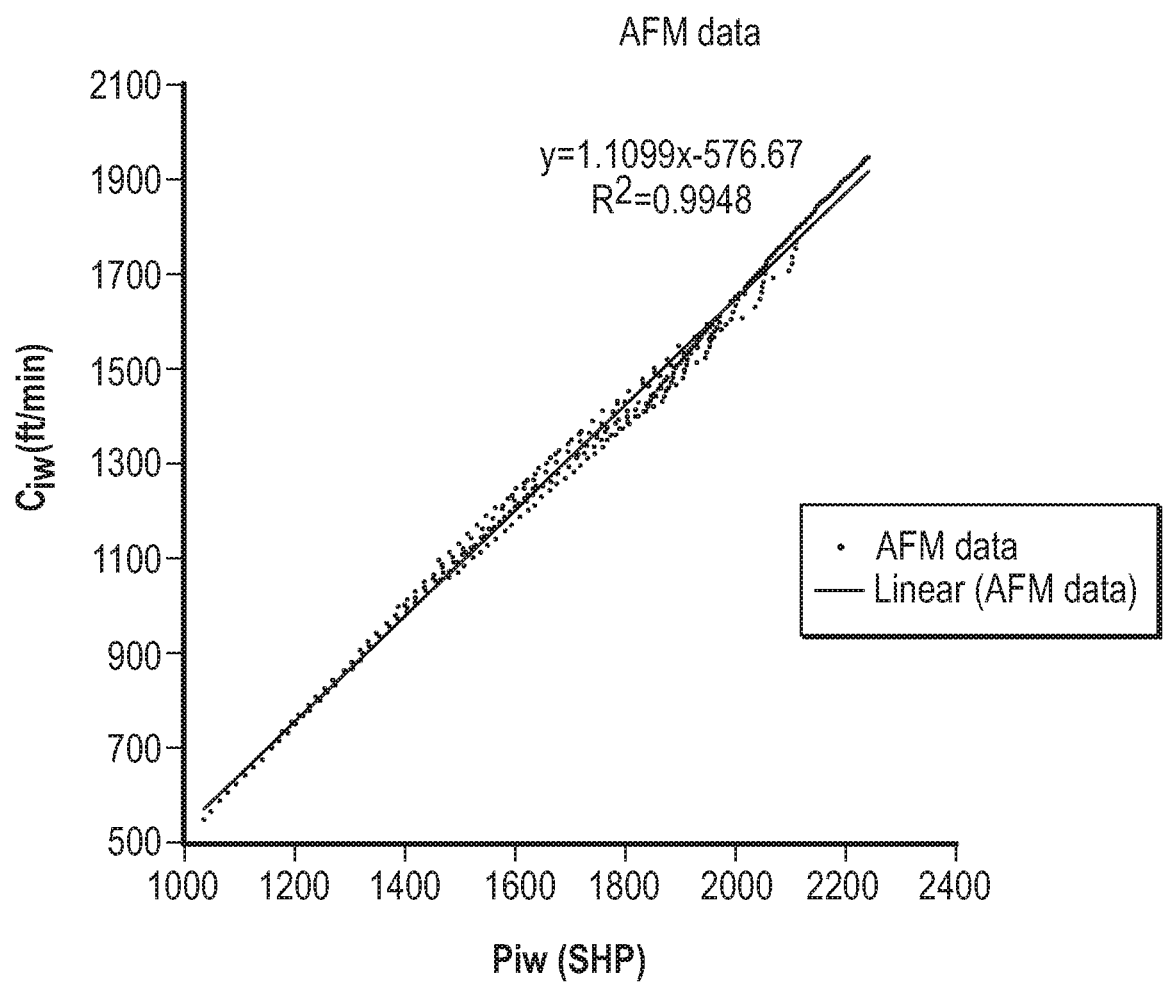
FIG. 1 illustrates a conventional single linear relationship relating normalized rate of climb (Ciw) and normalized shaft horsepower (Piw).
Figure 2:
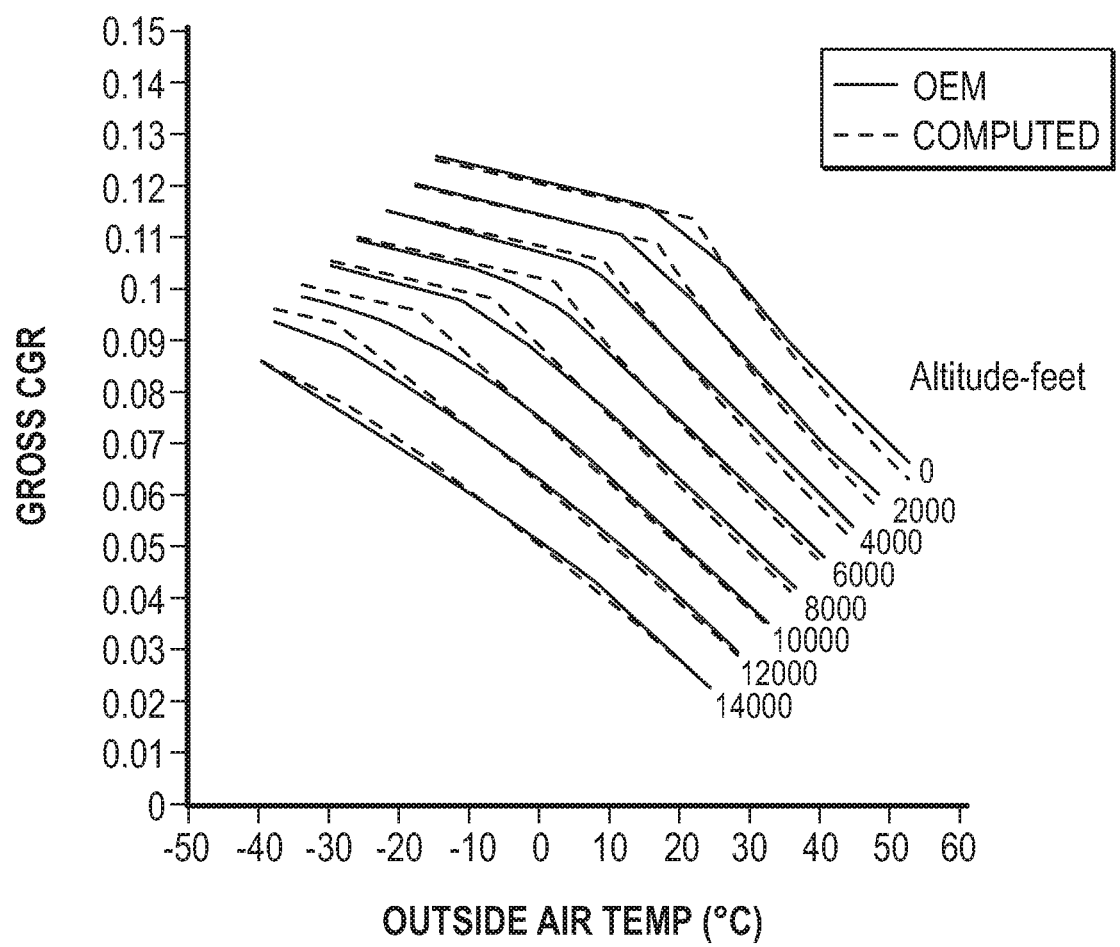
FIG. 2 illustrates original equipment manufacturer (OEM)-provided climb performance data together with superimposed computed analytical climb performance data generated from a conventional curve-fit linear relationship of normalized rate of climb (Ciw) to normalized shaft horsepower (Piw).

FIG. 2 illustrates original equipment manufacturer (OEM)-provided climb performance or climb gradient data provided in the form of a chart for a green (i.e., unmodified) Beechcraft King Air 350i (B300) type aircraft, together with superimposed (dashed line) analytical climb performance data generated from the conventional curve-fit linear relationship of normalized rate of climb (Ciw) to normalized shaft horsepower (Piw) of FIG. 1 for an unmodified Beechcraft King Air 350i (B300) type aircraft previously described. The computed analytical climb performance data of FIG. 2 is generated here for an unmodified aircraft in order to allow comparison of the data determined from a conventional curve-fit linear relationship of normalized rate of climb (Ciw) to normalized shaft horsepower (Piw) to the OEM data in order to judge the accuracy of the conventional curve-fit linear relationship as it may be applied to a modified aircraft to apply the penalties due to modification drag for a modified aircraft.

Specifically, the dashed analytical climb performance data of FIG. 2 is generated from the conventional data of FIG. 1 by means of converting the Piw-Ciw linear relationship into the corresponding climb gradient data, for all operational combinations of weight, altitude, and temperature. In FIG. 2, "CGR" represents climb gradient and may be calculated from the data of FIG. 1 using Equation 1 described further herein below, i.e., indirectly considering altitude through the air density ratio, σ. As shown in FIG. 2, the dashed computed analytical climb performance lines generated from the conventional FIG. 1 data do not match their corresponding OEM climb performance lines, but instead lie above the corresponding solid OEM climb performance lines at some temperatures and fall below the corresponding solid OEM climb performance lines at other temperatures. This requires each of the dashed computed analytical climb performance lines to be adjusted downward so that it fits at or below the corresponding solid OEM climb performance line, which means most values of each dashed computed analytical climb performance line will lie below the corresponding values of its corresponding OEM climb performance line. The practical consequence of this difference is that the climb performance of the aircraft is under-predicted, leading to (i.e., requiring) lower gross aircraft takeoff weights to meet operationally necessary climb gradients.

Figure 3:
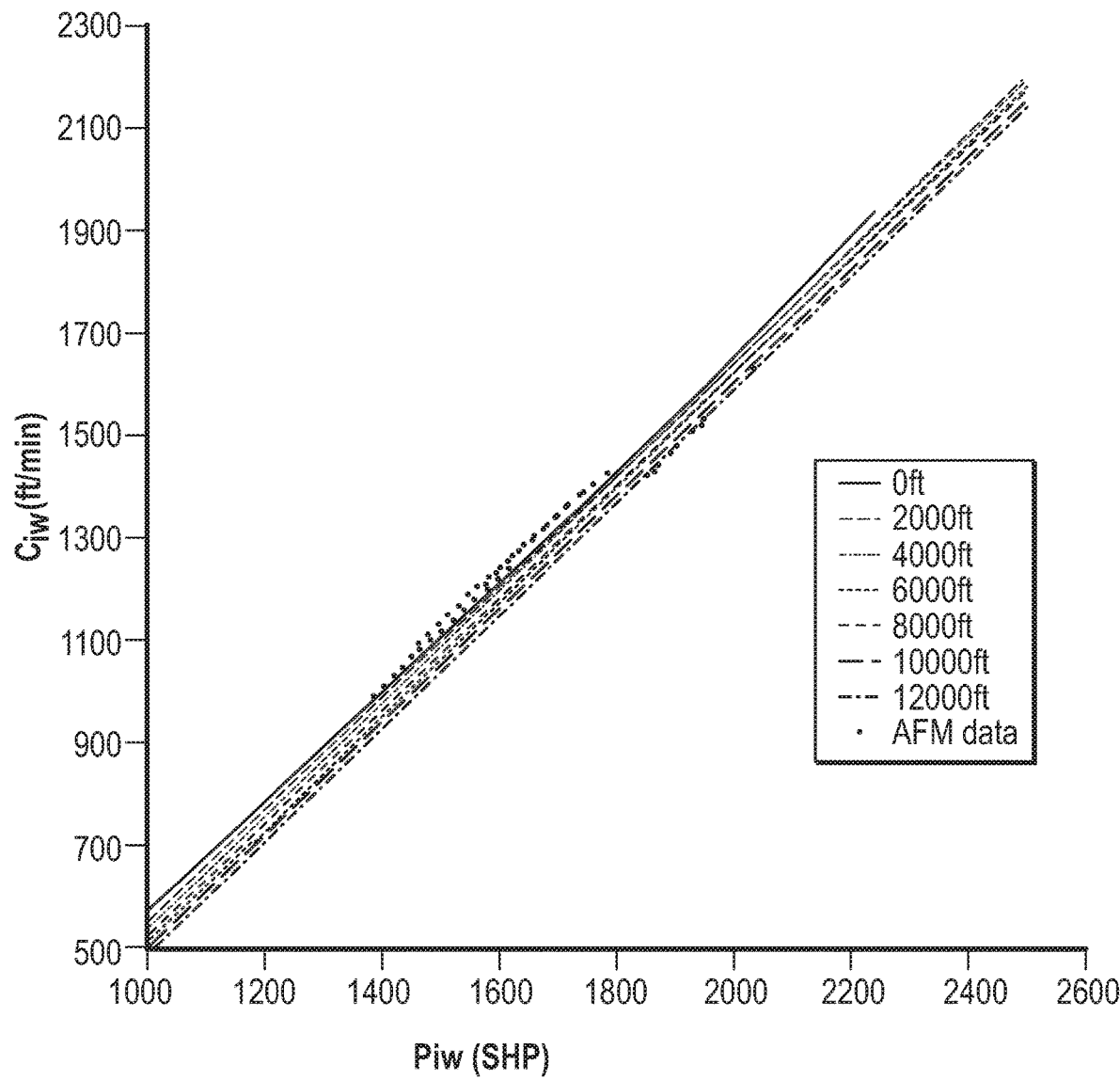
FIG. 3 illustrates a family of multiple linear Piw-Ciw relationship curves according to one exemplary embodiment of the disclosed methods and systems.

FIG. 3 illustrates a family of multiple linear Piw-Ciw relationship curves that may be generated for an unmodified or green OEM twin turboprop engine Beechcraft King Air 350i (B300) type aircraft according to one exemplary embodiment of the disclosed methods and systems. As shown in FIG. 3, the multiple linear relationships relate normalized rate of climb (Ciw) and normalized shaft horsepower (Piw) at different corresponding altitudes, e.g., at sea level "SL", 2000 feet above SL, 4000 feet above SL, etc. It will be understood that the data of FIG. 3 is exemplary only, and that the disclosed methods and systems may be alternatively employed to generate multiple linear relationships for different types of aircraft and/or different altitudes.

In one embodiment, each of the multiple linear relationships (lines) of FIG. 3 may be generated from (OEM)-provided climb performance or climb gradient data for a different given combination of altitude and weight using the following equations (1) and (2), e.g., by first solving for $P_{iw}$ at multiple different values of shaft horsepower (SHP) for a given combination of weight and altitude conditions, and then solving for the corresponding $C_{iw}$ at each different SHP for the same given combination of weight and altitude. In this way, a set of different values of $P_{iw}$ and corresponding values of $C_{iw}$ may be generated for each different given combination of weight and altitude conditions. Each such set of different $P_{iw}$ and $C_{iw}$ values may be used to create a respective corresponding line of FIG. 3, e.g., such as at sea level, 2000 feet, 4000 feet, 6000 feet and 8000 feet as shown in FIG. 3.

$$P_{iw} = SHP\sqrt{\sigma}\left(\frac{W_s}{W}\right)^{1.5} \quad (1)$$

$$C_{iw} = \frac{550*60*\eta_p}{W_s}P_{iw} - \frac{c_D}{c_L}V_{iw} \quad (2)$$

Where:

$$C_D = \text{Aircraft Drag Coefficient} = \frac{\text{Drag}}{\frac{1}{2}\rho V^2 S}$$

$C_{iw}$=Normalized Rate of Climb $$C_L = \text{Aircraft Lift Coefficient} = \frac{\text{Lift}}{\frac{1}{2}\rho V^2 S}$$

$P_{iw}$=Normalized Shaft Horsepower
SHP=Shaft Horsepower (Engine Horsepower as measured from engine instrumentation)
TAS=Airplane True Airspeed $$V_{iw} = \text{Normalized Aircraft Velocity} = V_{iw} = TAS\sqrt{\sigma}\left(\frac{W_s}{W}\right)^{0.5}$$

W=Aircraft Weight
$W_s$=Reference Aircraft Weight (Arbitrarily chosen reference weight such as =16,000 lbs as an example)
$\eta_p$=Propeller Efficiency
$\rho$=Air Density *

$$\sigma = \text{Density Ratio} = \frac{\text{Air Density}}{\text{Sea Level Air Density}}$$

*—Altitude is considered in the air density ratio, $\sigma$. The air density ratio is defined as the ratio of air density at altitude of interest to air density at sea level.

Table 1 illustrates example values of SHP, calculated $P_{iw}$, and calculated $C_{iw}$ using the above equations (1) and (2), e.g., for use in generating the 2000 feet altitude linear relationship of FIG. 3 for a King Air 350i (B300) type aircraft. Each of the other lines of FIG. 3 are similarly generated, and it will be understood that any number and/or combination of altitudes and aircraft weights may be similarly employed to generate any desired number of multiple linear relationships of a curve family. This is in contrast to the single linear relationship of FIG. 1 which over predicts climb performance for some points, and under predicts climb performance for other points.

TABLE 1

| | Calculated $P_{iw}$ and $C_{iw}$ | |
|---|---|---|
| SHP | *Calculated $P_{iw}$ | *Calculated $C_{iw}$ |
| 400 | 600 | 99.2 |
| 447 | 700 | 209.8 |
| 494 | 800 | 320.3 |
| 541 | 900 | 430.8 |

Figure 4A:
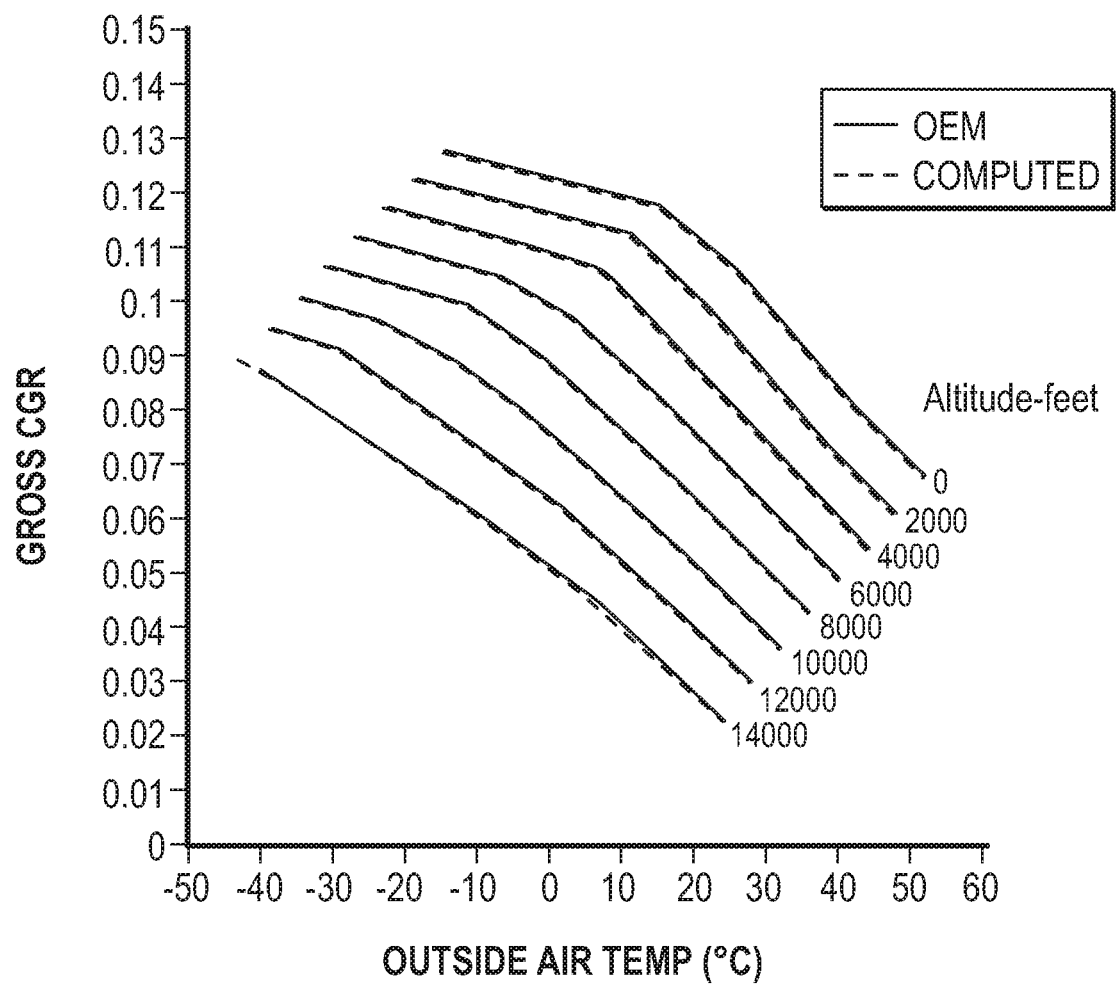
FIG. 4A illustrates original equipment manufacturer (OEM) climb performance data together with superimposed computed analytical climb performance data generated for an unmodified aircraft from the family of linear relationships FIG. 3.

*values in Table 1 calculated at 2000 Feet Above Sea Level and 10000 pounds (lbs) Gross Aircraft Weight FIG. 4A illustrates original equipment manufacturer (OEM) climb performance or climb gradient data in the form of a chart provided by the manufacturer for a Beechcraft King Air 350i (B300) type aircraft, together with superimposed (dashed line) computed analytical climb performance data generated from the family of linear relationships or lines of the embodiment of FIG. 3 for the unmodified aircraft. Since altitude variations are accounted for in the creation of the curve family of FIG. 3, a much better match with OEM climb performance data may be provided than is possible using a conventional curve-fit linear relationship of normalized rate of climb (Ciw) to normalized shaft horsepower (Piw) such as shown in FIG. 1. Thus, in one embodiment by more closely matching the OEM climb performance data, resulting climb performance for a modified aircraft may be maximized during flight operations, while still maintaining acceptable aircraft safety, e.g., such as when modification drag effects and additional engine power (e.g., via larger engine, existing engine modification, addition of turbocharger or supercharger, etc.) are added to a green aircraft. Thus, in such an embodiment aircraft climb gradient may be improved (increased) by utilizing the available excess additional power. This may be advantageous, for example, during operations in mountainous regions.

Figure 4B:
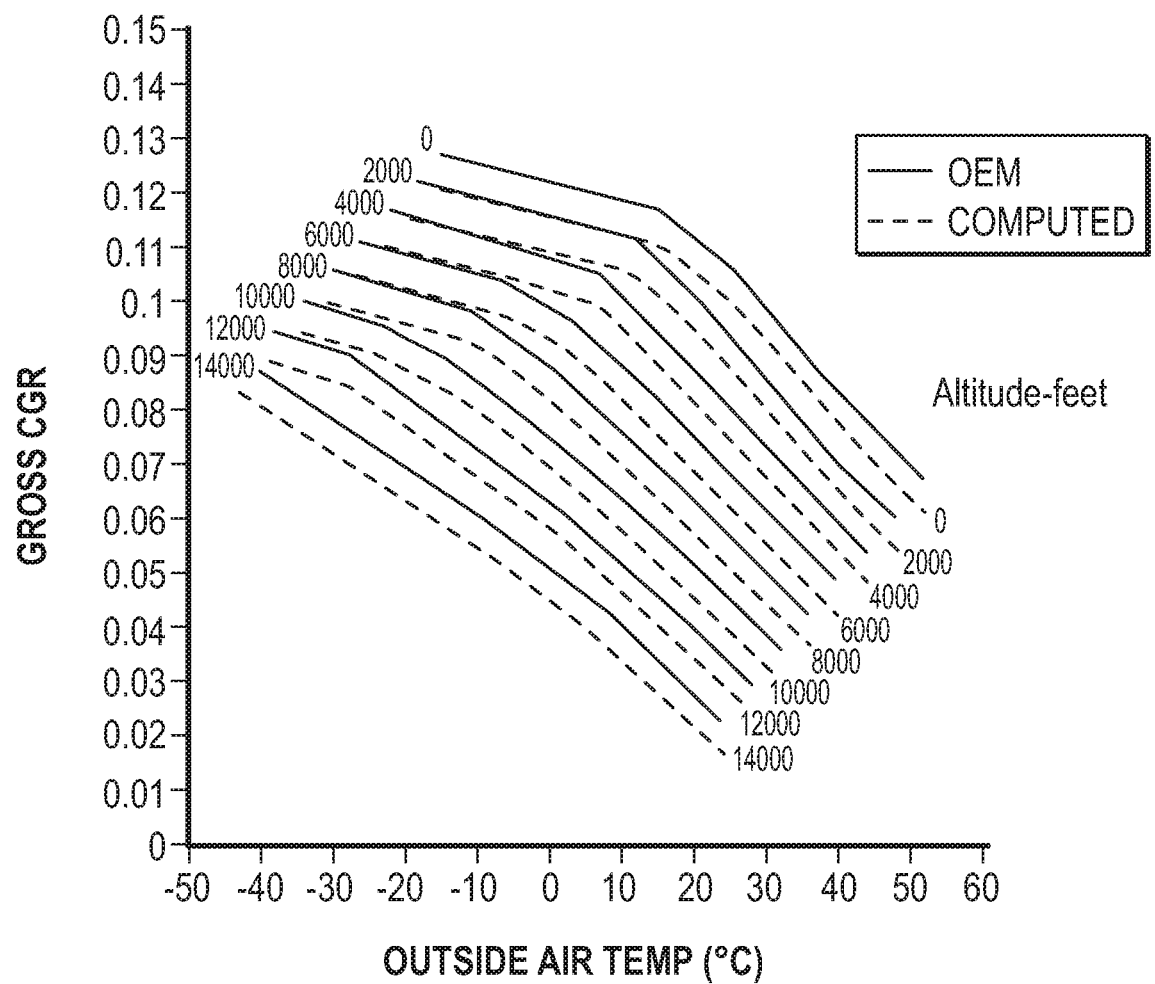
FIG. 4B illustrates original equipment manufacturer (OEM) climb performance data together with superimposed computed analytical climb performance data generated for a modified aircraft according to one exemplary embodiment of the disclosed methods and systems.

As an example, FIG. 4B illustrates a chart form of the same OEM climb performance or climb gradient data of FIG. 4A, but with superimposed analytical climb performance gradient data generated in part from flight testing of a modified aircraft as it may be provided, for example, in a flight manual, database or image display utilized by pilots to operate the modified aircraft. In FIG. 4B, each of the solid lines represents data for a different altitude, and the superimposed (dashed line) analytical climb performance data is generated at these same different altitudes for the modified aircraft from the family of linear relationships or lines of the embodiment of FIG. 3. Inflection points within each altitude line of FIG. 4B result from temperature limitations. The climb gradient performance data uses performance decrements measured during flight testing, and then expands the climb gradient data to all operational combinations of weight, altitude, and temperature. As described further herein in relation to FIGS. 5 and 6 herein, climb performance gradient data for a modified aircraft may be generated from a family of Piw-Ciw curves determined for the modified aircraft. Examples of aircraft modifications include, but are not limited to, drag effects and/or additional engine power that are added to an unmodified or green OEM aircraft.

For this example of FIG. 3 a green Beechcraft King Air 350i (B300) type aircraft has been modified in the same manner as described in relation to FIGS. 1 and 2. Examples of such drag effects include, but are not limited to, external payload attachment features, external payload components, and external fairings such as described in U.S. Pat. Nos. 9,676,482 and 9,669,927, each of which is incorporated herein by reference in its entirety for all purposes. In one embodiment, modifications may include any other structures that affect external air flow (and therefore drag) across aircraft surfaces during flight, and that are attached to, or otherwise placed adjacent to, external surfaces of the aircraft fuselage, wings, horizontal stabilizer, vertical stabilizer and/or control surfaces. Specific examples include, but are not limited to, external pods (e.g., underwing or under fuselage sensor pods or weapons pods), other modifications to the external aircraft outline, e.g., such as enlarged or otherwise modified external fuselage outline and/or modified wing, horizontal stabilizer, vertical stabilizer and/or control surface external outline for accommodating specialized cargo, internal equipment or sensors, engine modifications or addition, etc.

Figure 5:
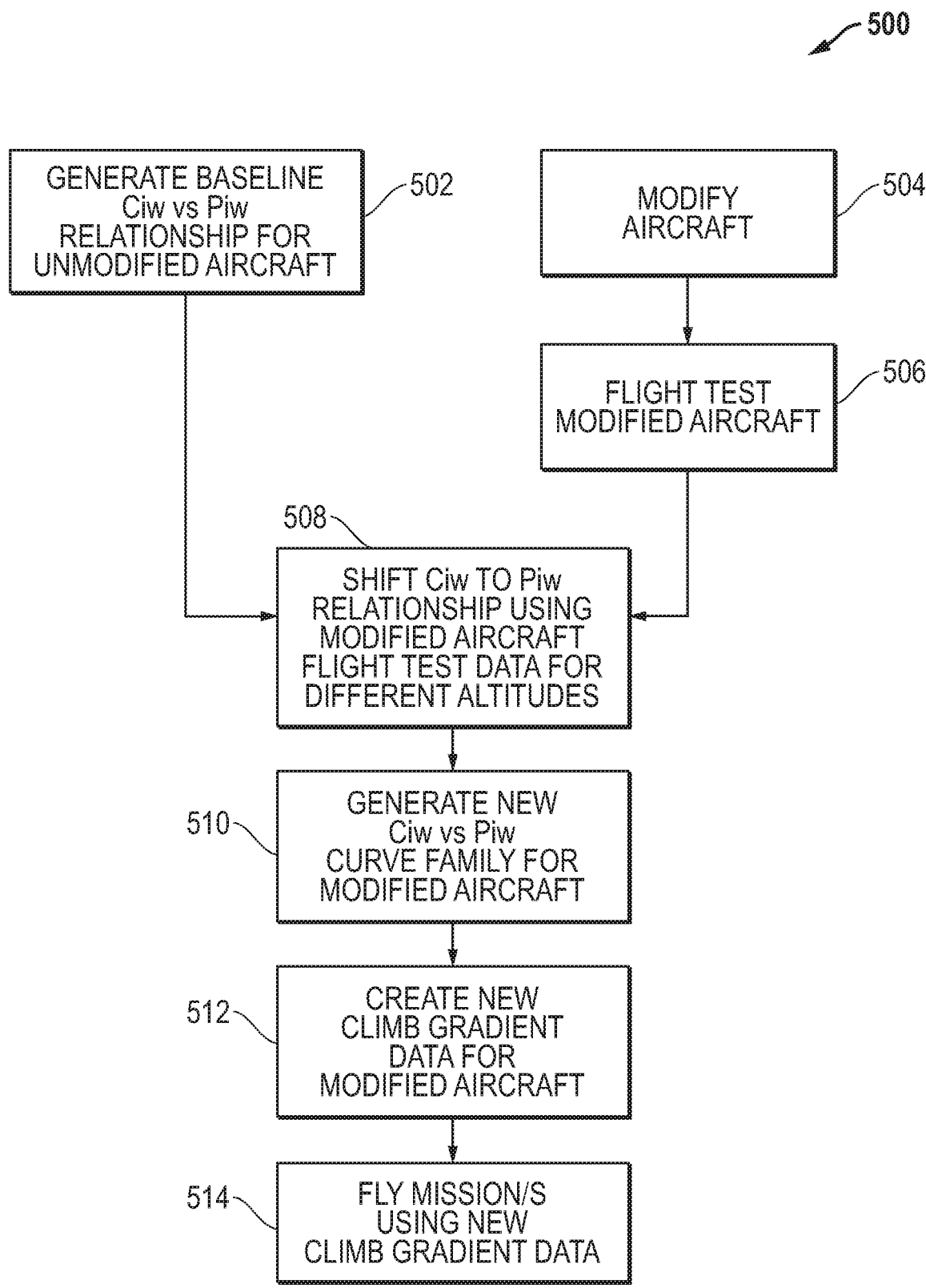
FIG. 5 illustrates methodology according one exemplary embodiment of the disclosed methods and systems.
Figure 6:
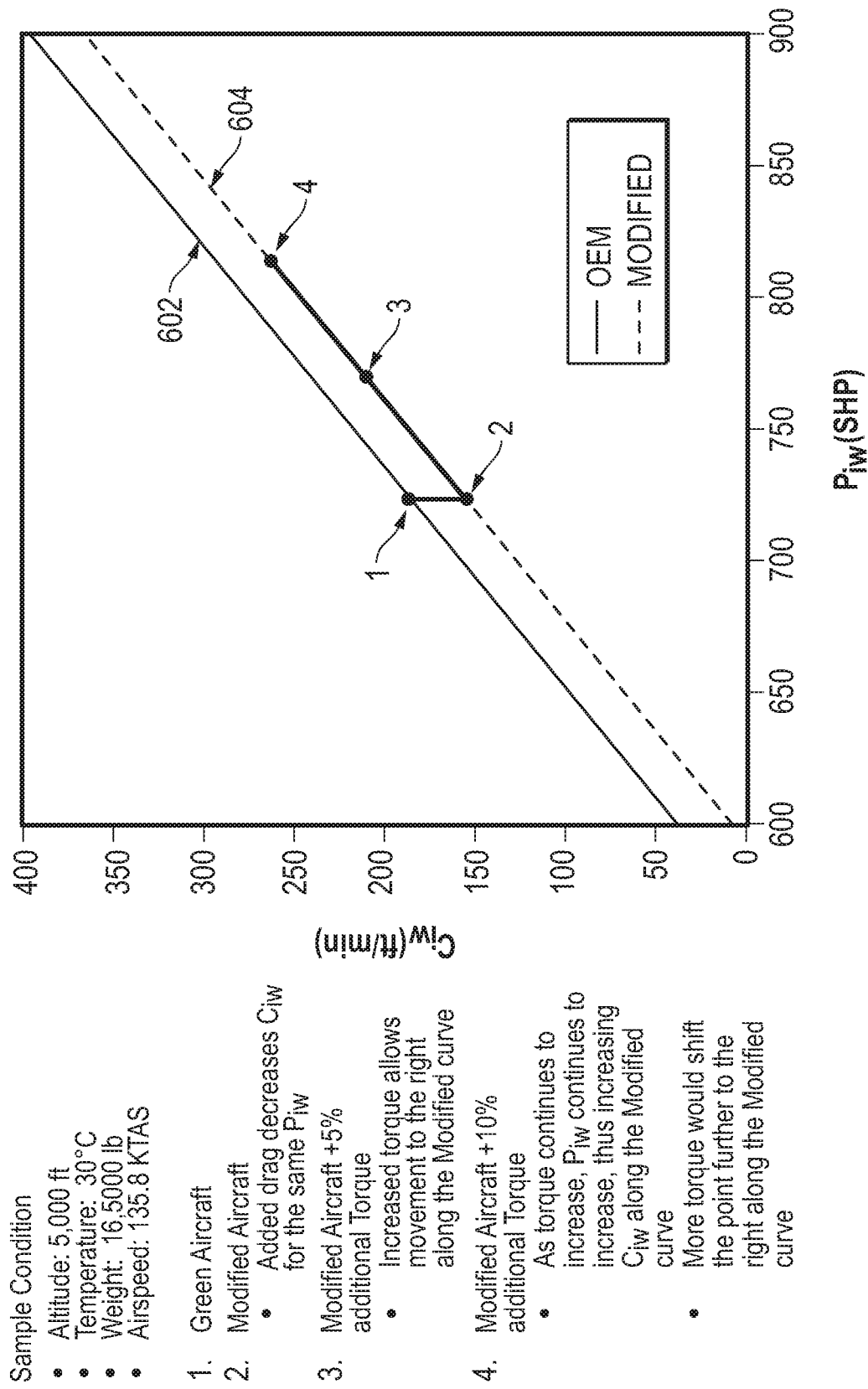
FIG. 6 illustrates generation of modified Piw-Ciw curve for a modified aircraft according one exemplary embodiment of the disclosed methods and systems.

FIG. 5 illustrates one exemplary embodiment of a methodology 500 that may be employed starting with a baseline $C_{iw}$ versus $P_{iw}$ curve family similar to that shown in FIG. 3 for an unmodified twin turboprop engine Beechcraft King Air 350i (B300) type aircraft. Methodology 500 begins in step 502 with the relationship between normalized rate of climb ($C_{iw}$) and normalized shaft horsepower ($P_{iw}$) for a baseline (unmodified or green) OEM aircraft. This is illustrated in FIG. 6, where curve 602 for an unmodified green aircraft may be generated using equations (1) and (2) from (OEM)-provided climb performance or climb gradient data such as illustrated by the solid lines in FIG. 4A, e.g., in a manner as described previously. In FIG. 6, point 1 on a linear curve 602 represents the rate of climb ($C_{iw}$) for a given $P_{iw}$ at the selected atmospheric conditions given on FIG. 5 for the baseline OEM unmodified green aircraft. In FIG. 6, curve 602 is generated for an altitude of 5000 feet, temperature of 30° C., aircraft weight of 16,500 lbs, and airspeed of 135.8 knots true airspeed (KTAS).

In step 504, drag characteristics of the same type of unmodified green aircraft (Beechcraft King Air 350i (B300)) may be physically modified (e.g., by adding external payload attachment features, external payload components, and external fairings to the aircraft) and/or power characteristics of the same type of unmodified green aircraft may be modified. This modified aircraft may be flight tested in step 506 at different altitudes and the available test data converted into values of $C_{iw}$ for corresponding different $P_{iw}$ values at each different altitude so as to generate a $P_{iw}$-$C_{iw}$ linear relationship for the modified aircraft. It will be understood that the sequence of step 502 relative to steps 504 and/or 506 may vary, and that step 504 and/or 506 may be performed before step 502 or thereafter.

It is noted that flight testing of step 506 may only cover a limited subset of operating flight conditions within the aircraft's operational envelope (e.g., under multiple different operating flight conditions that include different aircraft gross or all-up weights "AUW", operating altitudes, operating air temperatures, etc., and combinations therefor), and performance decrements determined from this limited subset of the envelope. As further described below, the baseline curve of step 502 may then be used as a starting point in step 508 for the analysis, and then the flight test determined performance decrements may be applied analytically across the entire operational envelope.

Next, in step 508, the baseline $P_{iw}$-$C_{iw}$ curve 602 for the unmodified OEM aircraft is shifted using Equations (1) and (2) based on the flight test data from step 506 of the modified aircraft configuration. For example, the $P_{iw}$-$C_{iw}$ curve 602 is shifted downward from Point 1=approximately 185 feet per minute and $P_{iw}$=approximately 740 SHP) on the unmodified aircraft curve 602 to Point 2=approximately 150 feet per minute and $P_{iw}$=approximately 740 SHP) in FIG. 6 due to added drag of the aircraft modifications which decreases the value of $C_{iw}$ at the same given $P_{iw}$ value, i.e., Point 2 is the reduced $C_{iw}$ value that is a result of the increased drag of the modified aircraft configuration at the same given $P_{iw}$ value. It will be understood that the direction and magnitude of $C_{iw}$ value shown in FIG. 6 is exemplary only, and that other types of modifications may result in downward and/or upward shifts in $C_{iw}$ of greater or lesser magnitude for a given $P_{iw}$ value, e.g., $C_{iw}$ value of curve 602 may be shifted upward for modifications that reduce drag of the aircraft. Additionally, modifications in aircraft engine power move $P_{iw}$ value along curve 602 or 604 in direction of greater or lesser $P_{iw}$ value as the case may be.

A modified Piw-Ciw curve as shown in FIG. 6 may then be generated in step 510, e.g., by shifting curve 602 downward to position of modified curve 604, based on a ΔCiw climb performance decrement, which is obtained through step 506 flight testing of a modified aircraft. This determined ΔCiw climb performance decrement then used to shift OEM curve 602 to modified aircraft curve 604, as seen in FIG. 6. In the embodiment of FIG. 6, modified aircraft line 604 passes through Point 2 that is parallel to the baseline aircraft curve 602. As further shown in FIG. 6, values of $C_{iw}$ for different $P_{iw}$ values for the modified aircraft may be determined by reading a value of $C_{iw}$ from modified aircraft curve 604 that corresponds to any given $P_{iw}$ value. For example, Points 3 and 4 in FIG. 6 illustrate the possible changes in $C_{iw}$ if additional engine power is attainable for the modified aircraft, i.e., allowing movement to the right along the modified aircraft curve 604. In particular, Point 3 represents a new value of $C_{iw}$ (approximately 210 feet per minute) that corresponds to a $P_{iw}$ value (770 SHP) representing a 5% increase in engine torque, and Point 4 represents a new value of $C_{iw}$ (approximately 265 feet per minute) that corresponds to a $P_{iw}$ value (815 SHP) representing a 10% increase in engine torque (i.e., allowing movement further to the right along the modified aircraft curve 604). It will be understood that engine power characteristics may be physically increased, for example, by increasing either propeller RPM or engine torque for a turboprop aircraft, with the manner of doing so varying slightly between different aircraft types.

Returning to step 510 of FIG. 5, additional modified curves similar to curve 604 (but spaced a different distance from curve 602 than is curve 604) may be generated at different altitudes so as to create a family of Piw-Ciw curves (similar to FIG. 3) for the modified aircraft. In this regard, for a climb segment, ΔCiw is obtained for a range of test altitudes. The maximum ΔCiw is then applied across all altitudes analytically using Equations (1) and (2).

Next, in step 512, new climb performance gradient data such as illustrated in FIG. 4B may be generated from the family of Piw-Ciw curves determined for the modified aircraft, and then optionally presented in a flight manual or database utilized by pilots to operate the modified aircraft. The new climb performance gradient data of step 512 may be alternatively provided in other suitable form for use in operation of the modified aircraft, e.g., such as in the form of a database or lookup table that is executed by one or more processing device for display on a portable computer (e.g., tablet computer, laptop computer, etc.), cockpit mounted instrument (e.g., such as illustrated and described in relation to FIG. 9), etc. In optional step 514, the new climb performance gradient data from step 512 may be used to set or change one or more flight parameters during operation of the modified aircraft. Examples of such flight parameters that may be set or changed during flight operations include, but are not limited to, set or change engine torque or power during takeoff climb to increase climb rate over OEM climb rate of unmodified aircraft, set or change initial gross aircraft weight during takeoff, etc.

In one embodiment, the computed analytical climb performance gradient data curve of FIG. 4B (which includes all data plotted in FIG. 4B) may correspond to a modified aircraft determined to have no extra or excess engine torque (or other measure of power) that is actually available at the aircraft's maximum allowable engine operating temperature as compared to the available engine torque (or other power measurement) predicted by the OEM airplane flight manual data to be available at the maximum allowable engine operating temperature for the unmodified aircraft. One example type of such a maximum allowable engine operating temperature is a maximum allowable Turbine Inlet Temperature (TIT) limit set for a turboprop engine by the airplane flight manual. However, a maximum allowable engine operating temperature value may be any other suitable type of engine operating temperature, e.g., such as Exhaust Gas Temperature (EGT), Interstage Turbine Temperature (ITT) etc.

In any case, the actual engine power (e.g., torque) available for a modified aircraft may be determined using any suitable technique, e.g., such as a pre-flight "engine run-up" procedure performed prior to a flight mission during which engine torque (or other power measurement) and operating temperature are measured simultaneously at the same time that the engine speed (RPM) is increased until the maximum allowable engine operating temperature is reached and the corresponding engine torque (or other power measurement) recorded. Examples of other types of power measurements that may be similarly employed in the practice of the disclosed methods and systems include, but are not limited to, thrust, fan speed, pressure ratio (EPR), horsepower, etc.

It will be understood that in one embodiment a full set of performance charts for each of multiple different given actual engine power levels available may be generated and expressed relative to the airplane flight manual static torque chart, such that the amount of engine power developed during the pre-takeoff engine checks may be used by the pilot to select which set of performance charts to use. In this regard, multiple different computed analytical climb performance data curves such as illustrated in FIG. 4B may be generated for different values of available excess engine power (e.g., such as 25% available excess engine power, 20% available excess engine power, 15% available excess engine power, 10% available excess engine power, etc.), and then the appropriate computed analytical climb performance data curve selected in step 514 that corresponds to (or corresponds most closely to) the measured actual engine power available for a modified aircraft. In one embodiment, the multiple curves of FIG. 4B may be generated using the linear curves of FIG. 3, and moving right along those FIG. 3 curves according to how much additional engine torque is available. The additional Piw may then be converted into a corresponding increase in Ciw. In one embodiment, climb performance data for one given value of excess engine torque (such as presented for one given value of excess engine torque in FIG. 4B) may be selected that corresponds to a value of available excess engine power that is closest to the determined actual available excess power value (or closest to a rounded-off value of the determined actual available excess power value). A full set of performance charts for any given engine power available may be expressed relative to the airplane flight manual static torque chart, and the amount of engine power developed during the pre-takeoff engine checks dictates to the pilot which set of performance charts to use.

It will be understood that the steps of FIG. 5 are exemplary only, and that any combination of fewer, additional and/or alternative steps may be employed that are suitable for generating and/or using new climb performance gradient data for a modified aircraft.

Figure 7:
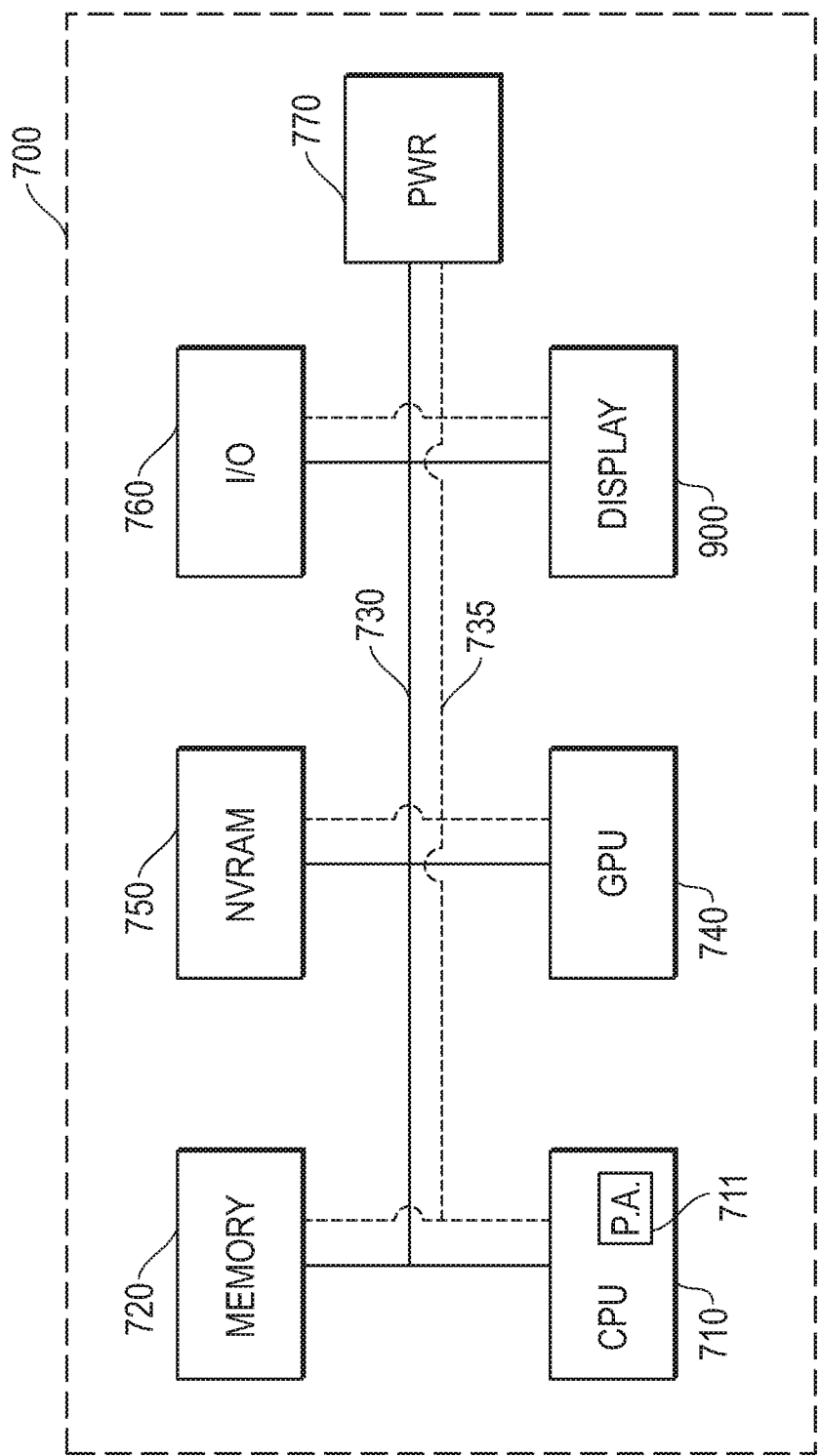
FIG. 7 illustrates a system according to one exemplary embodiment of the disclosed methods and systems.
Figure 9:
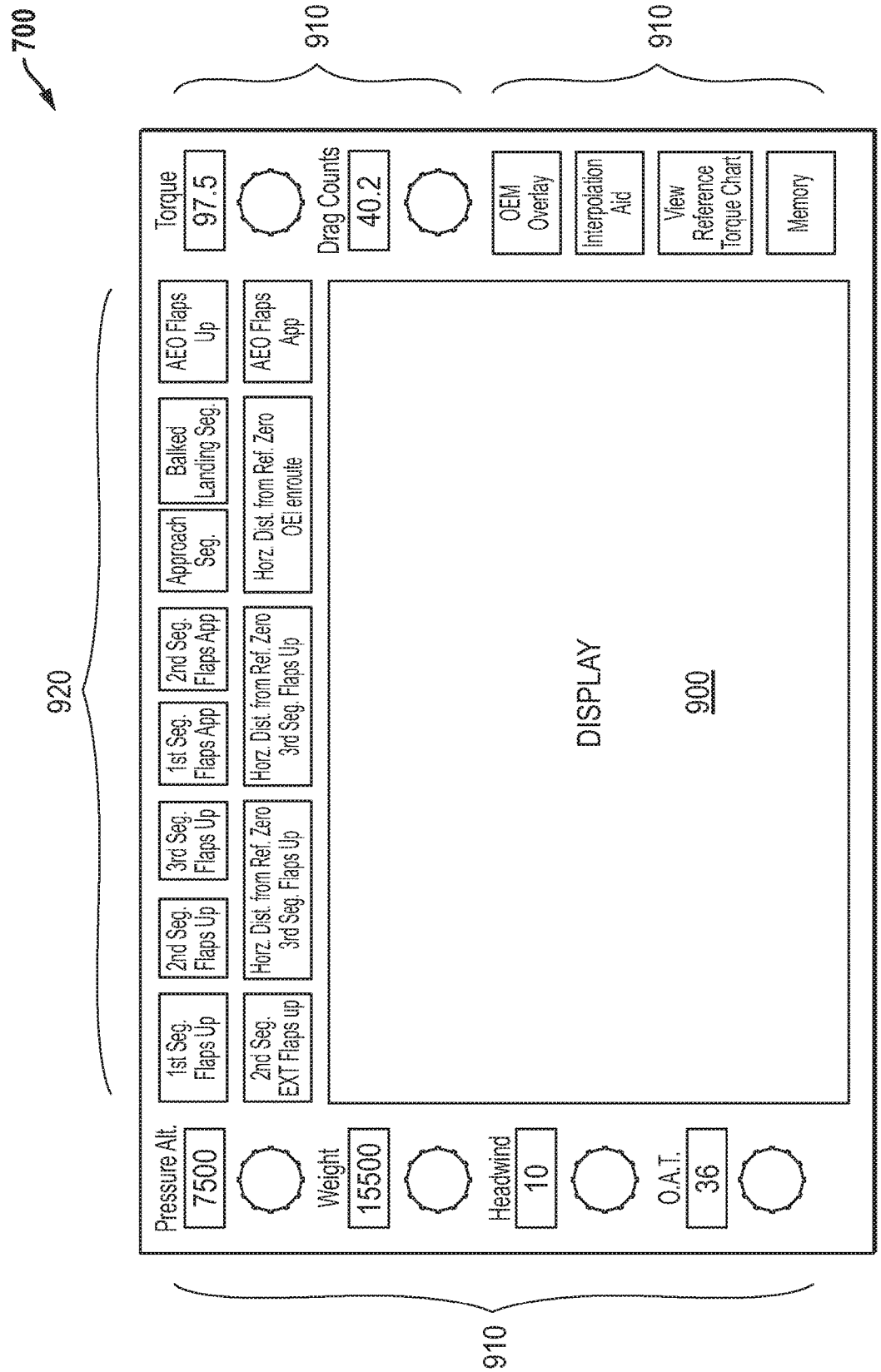
FIG. 9 illustrates a system according to one exemplary embodiment of the disclosed methods and systems.

With reference now to FIG. 7, there is depicted a block diagram representing a generalized embodiment of a system 700 that may be employed for generating and/or implementing one or more steps of methodology 500 and/or functionalities of system 700 described in relation to FIGS. 7 and 9. As shown in FIG. 7, system 700 may include one or more system resources including, but not limited to, processors or other processing devices, busses, computer-readable media, input-output devices and/or interfaces, storage resources, network interfaces, motherboards, electro-mechanical devices (e.g., fans), and/or power supplies. System 700 may also optionally include an integrated display 900 (e.g., including light emitting diode (LED), organic LED (OLED), liquid crystal display (LCD), electroluminescence (EL) or other display technology). Alternatively, the other components of system 700 (besides integrated display 900) may be coupled to an external display of similar type/s.

In the embodiment shown in FIG. 7, system 700 includes a processing device that includes at least one central processing unit (CPU) 710, which is coupled to system memory 720 via system interconnect 730 (otherwise referred to as a system bus). Also coupled to CPU 710, via system interconnect 730, is a graphics card with a graphics processing unit (GPU) 740 located thereon, nonvolatile storage (NVRAM) 750 such as solid state drive or disk drive, and one or more input/output devices 760. Input/output (I/O) devices 760 may include, but are certainly not limited to, keyboards, mice, touch pads, speakers, and cameras. Further examples of I/O devices 760 are found described herein in relation to FIG. 9.

System 700 requires a power source to operate the various electronic components disposed therein. The power source can be provided via an external power source (e.g., mains power) and an internal power supply regulator, and/or by an internal power source, such as a battery. As shown in FIG. 7, power management system 170 may be included within system 700 for moderating the available power from the power source. The power management system 170 may be coupled to one or more components of the system 700 via a power bus 735 to provide the required power, as well as to perform other power-related administrative tasks of the system.

System memory 720 and/or NVRAM 750 may be generally configured to store software and/or firmware modules and one or more sets of data that can be utilized during operation of system 700. In some embodiments, one or more of these software and/or firmware modules can be loaded into system memory 720 from NVRAM 750 during operation of system 100. In one embodiment, system memory 720 may include, or may be loaded with, a plurality of such modules, including, a basic input/output system (BIOS), an operating system (OS), as well as one or more firmware (FW) modules and/or one or more user application(s) such as firmware and/or application programming for performing one or more of the steps of methodology 500. These software and/or firmware modules have varying functionality when their corresponding program code is executed by a main processing device (e.g., CPU 710) or a secondary processing device (e.g., GPU 740) of system 700.

As noted above, system 700 also includes a display device 900, which may be a part of, or communicatively coupled to, the system 700. For example, display device 900 may be permanently or detachably affixed to the system 700, when system 100 is a laptop computer, tablet computer, e-reader, "2 in 1" system or a mobile device (e.g., PDA or smart phone), aircraft cockpit avionics component or module, etc. Alternatively, display device 900 may be a stand-alone display device, which is communicatively coupled to system 700 via one or more cables and/or other interfaces (e.g., a docking station), when system 100 is a desktop computer or any other configuration with separate stand-alone display device. Regardless of whether the display device 900 is a stand-alone device, or integrated with the system 700, display device 900 may be coupled to receive and/or transmit data signals from/to a processing device (e.g., CPU 710 or GPU 740) of system 710, and may be further coupled to receive power from the power management system 170 within system 100.

Regardless of the type of display technology used (e.g., LCD, LED, OLED, EL, etc.), display device 900 may include a touch sensitive input device that enables a user to provide input to the system 700 through direct interaction with the display device. As noted above, a display device comprising a touch sensitive input device (i.e., a touch screen display device, or simply "touch screen") may be present to enable a user to provide input to, or interact with, display device 900 or system 700 via touch events, which are detected by components of the touch sensitive input device at precise locations on the touch screen.

Figure 8:
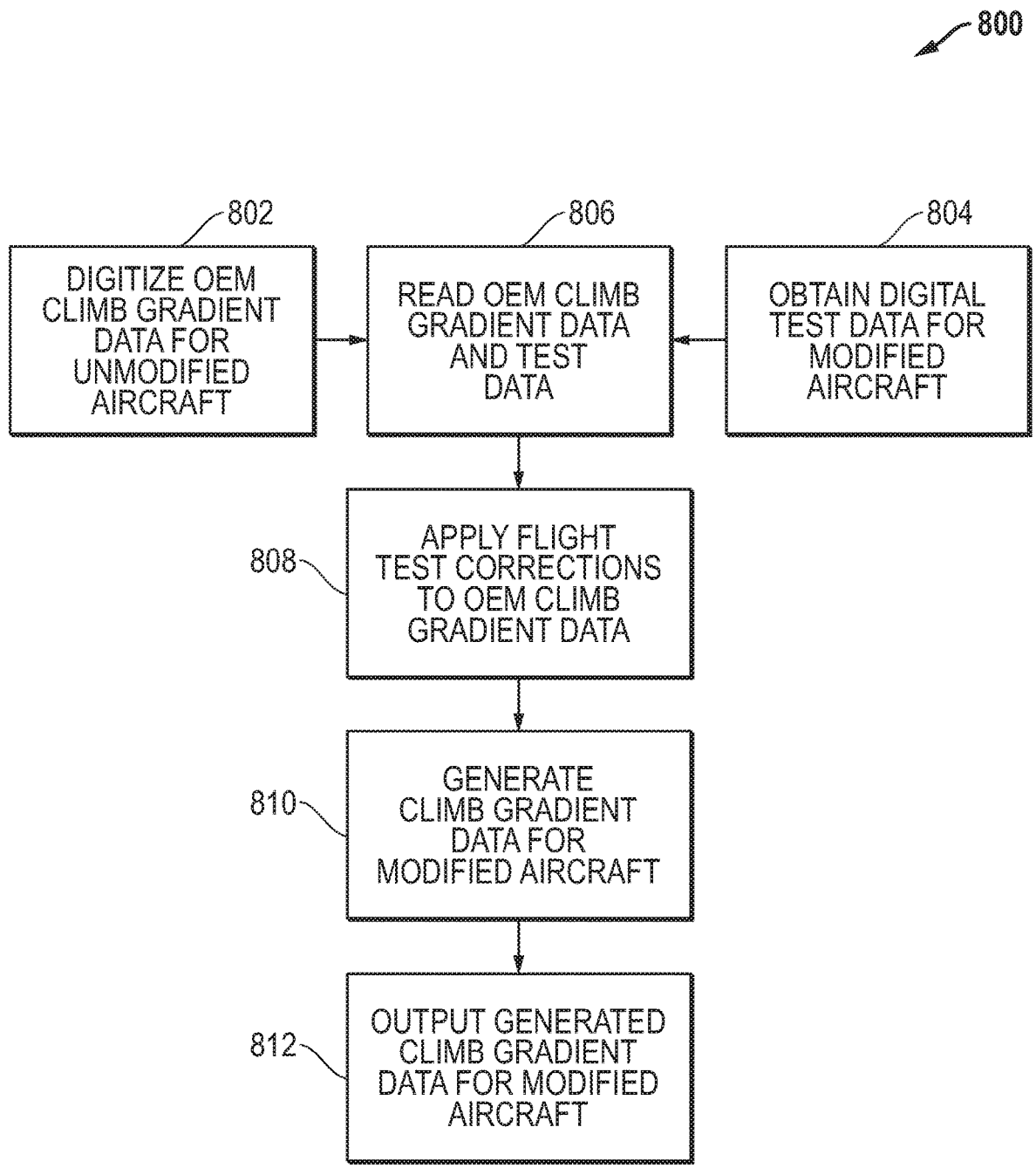
FIG. 8 illustrates methodology according to one exemplary embodiment of the disclosed methods and systems.

FIG. 8 illustrates one exemplary embodiment of methodology 800 that may be employed in one embodiment to generate climb performance gradient data for (e.g., such as illustrated in FIG. 4B) for a modified aircraft using a system such as described and illustrated in relation to FIG. 7. As shown, methodology 800 starts in step 802 where OEM climb data for an unmodified aircraft (e.g., Beechcraft King Air 350i (B300) type aircraft) is obtained in digital form (e.g., such as by digitizing the solid OEM curve data of FIG. 4A) and then converted into $P_{iw}$-$C_{iw}$ linear relationship such as illustrated in FIG. 3 using Equations (1) and (2) and compiled in Excel spreadsheet or a lookup table which may be stored on NVRAM 750 of FIG. 7. Separately, in step 804, available test data for a modified version of the same type of aircraft is converted into digital $P_{iw}$-$C_{iw}$ linear relationship (e.g., such as shown in Table 1) and compiled in Excel spreadsheet or a lookup table which may be stored on NVRAM 750 of FIG. 7. Steps 802 and/or 804 may be performed in one embodiment by power assurance application 711 or other firmware of software code (e.g., such as C++ object-oriented code) executing on a CPU 710 or other suitable processing device of a system such as illustrated and described in relation to FIG. 7.

In one embodiment, each of the unmodified aircraft $P_{iw}$-$C_{iw}$ linear relationship data of step 802 and modified aircraft $P_{iw}$-$C_{iw}$ linear relationship data of step 804 may be read (e.g., such as from NVRAM 750 of FIG. 7) in step 806 by an application or other firmware or software code 711 executing on CPU 710 or other suitable processing device. Next in step 808, the application or other firmware or software code 711 may apply flight test corrections to the OEM climb data for the unmodified aircraft using the test data for the modified version of the same type of aircraft to define aircraft performance of the modified configuration, e.g., to account for modified drag of the modified aircraft configuration and/or by applying increments of additional (or excess) engine torque to the modified configuration by applying increments of excess power to modified configuration to generate the new climb gradient data for the modified aircraft. This may be done, for example, in the manner previously described in relation to FIG. 6. Afterwards in step 810, climb performance gradient data (e.g., such as illustrated in FIG. 4B) may be generated for the modified aircraft by the application or other firmware or software code 711. In one embodiment, this new climb performance gradient data of step 810 may be output in step 812 (e.g., as Excel spreadsheet or lookup table) that may be plotted and formatted for publishing in hard copy format (e.g., printed paper) and/or for display on display device 900 for use by air crews during aircraft operations and missions as described previously with regard to step 514.

FIG. 9 illustrates one particular exemplary embodiment of a system 700 as it may be configured as an electronic flight planning aid, e.g., as a battery-powered portable computer system or other type of portable computer system that may be carried on-board and off-board an aircraft in a pilot's flight bag, as an avionics component that is mounted within the cockpit and optionally coupled to exchange flight data such as airspeed and altitude with other avionics components, etc. One or more processing devices (e.g., CPUs 710) of system 700 may execute an application or other firmware or software code 711 that displays climb performance gradient data on display 900 for a modified aircraft as described in steps 810 and 812 of FIG. 8, e.g., using C++ code running in the background. As shown, the exemplary embodiment of system 700 shown in FIG. 9 includes various I/O devices that allow for mechanical (e.g., user) input of independent flight condition parameters (e.g., such as altitude, air temperature, aircraft weight, engine torque or power, aircraft drag, and headwinds or tailwinds) with auto range limits (e.g., such as limits for aircraft weight or engine torque/power, so as to not inadvertently exceed the structural or mechanical limits of the aircraft). In response to input of the entered parameters, system 700 may display climb gradient charts tailored for one or more altitudes and other user-input flight conditions of a given climb segment.

In one embodiment, processing device/s of system 700 may be programmed to provide an overlay of various charts on display 900 that electronically show regions of performance deficit. In another embodiment, processing device/s of system 700 may be programmed to implement dynamic redrawing of interpolation aids (e.g., such as chase chart lines) that are overlaid over climb charts (e.g., such illustrated herein in FIG. 4B) on display 900 based on input parameters (e.g., such as altitude, aircraft weight, headwinds or tailwinds, outside air temperature, engine torque, and aircraft drag). In a further embodiment, processing device/s of system 700 may be programmed to allow easy switching between climb segments by depressing the appropriate toggle switch from the additional I/O devices 920. Further information regarding possible dedicated I/O devices 910 and corresponding system features that may be implemented by processing device/s of system 700 are provided in Table 2 below. Additional I/O devices 920 include toggle switches which may be present for purposes of selecting the appropriate climb segment. It will be understood that FIG. 9 is exemplary only, and that the number and type of I/O devices 910 and/or 920 may vary in different embodiments.

TABLE 2

System Features

| Dedicated I/O Devices 910 | Feature Description |
|---|---|
| Pressure Alt. | Multifunction rotary dial allowing for the input and input lockout for the pressure altitude parameter. |
| Weight | Multifunction rotary dial allowing for the input and input lockout for the weight parameter. |
| Headwind | Multifunction rotary dial allowing for the input and input lockout for the Headwind parameter. |
| O.A.T. | Multifunction rotary dial allowing for the input and input lockout for the outside air temperature parameter. |
| Torque | Multifunction rotary dial allowing for the input and input lockout for the engine torque parameter. |
| Drag Counts | Multifunction rotary dial allowing for the input and input lockout for the drag counts parameter. |
| OEM Overlay | Button to toggle on/off an overlay of OEM airplane flight manual version of the current climb chart. |
| Interpolation Aid | Button to toggle on/off chase chart interpolation lines for the current input condition that are displayed in a similar manner to the example calculation lines found on the OEM climb charts. |
| View Reference Torque Chart | Button allowing for the display of the reference torque chart to which the achievable torque will be compared. |
| Memory | Allows for the storage and recollection of a set or sets of input settings |

It will be understood that one or more of the tasks, functions, or methodologies described herein (e.g., including those described herein for components 710, 711, 740, as well as other components of system 700 and/or as described in relation to Table 2) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in a processing device, computer system or component thereof. The executable instructions may include a plurality of code segments operable to instruct components of a processing device or computer system to perform the methodologies disclosed herein.

It will also be understood that one or more steps of the present methodologies may be employed in one or more code segments of the computer program. For example, a code segment executed by one or more processing devices may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method, comprising:
flight testing a modified fixed wing aircraft under multiple different flight conditions, the modified aircraft having one or more aircraft engines propelling the aircraft through the air, and the multiple different flight conditions comprising at least one of multiple different gross weights, multiple different operating altitudes, multiple different operating air temperatures, or combinations thereof;
recording flight test data during the flight testing of the modified aircraft, the recorded flight test data comprising measured rate of climb and corresponding aircraft engine power at each of the multiple different flight conditions;
generating a relationship between rate of climb and aircraft engine power at multiple different altitudes for the modified aircraft based on the recorded flight test data; and
generating a relationship between values of climb performance gradient and air temperature to operate the modified aircraft at the multiple different altitudes.

2. The method of claim 1, further comprising generating the relationship of rate of climb to aircraft engine power at different altitudes for the modified aircraft by modifying a relationship of rate of climb to aircraft engine power at different altitudes for an unmodified version of the same type of aircraft based on the recorded flight test data for the modified aircraft.

3. The method of claim 1, where the modified aircraft comprises modifications made to an unmodified version of the same type of aircraft, the modifications comprising structures that affect external air flow across the structure of the modified aircraft and/or affect engine power of the modified aircraft.

4. The method of claim 3, where the modifications to the unmodified aircraft comprise at least one of external payload attachment features, external payload components, external fairings or a combination thereof.

5. The method of claim 1, further comprising then flying a mission with the modified aircraft after the step of generating a relationship between values of climb performance gradient and air temperature; and operating the modified aircraft during the mission la setting or changing at least one of engine torque or power during mission takeoff climb or gross aircraft weight during mission takeoff according to the generated relationship between values of climb performance gradient and air temperature for the modified aircraft at the multiple different altitudes.

6. The method of claim 5, further comprising: generating multiple different relationships between values of climb performance gradient and air temperature for the modified aircraft at the multiple different altitudes, each of the multiple different relationships being generated to correspond to different values of available aircraft engine power at the maximum allowable operating temperature of the aircraft engine;

determining actual available engine power at the maximum allowable engine operating temperature for the modified aircraft prior to flying the mission;

then selecting one of the multiple generated relationships that corresponds to a value of available aircraft engine power that is closest to the determined actual available engine power for the modified aircraft; and then operating the modified aircraft during the mission by setting or changing the at least one of engine torque or power during the mission takeoff climb or the gross aircraft weight during the mission takeoff according to the selected relationship between values of climb performance gradient and air temperature for the modified aircraft.

7. The method of claim 5, where the step of generating a relationship between values of climb performance gradient and air temperature comprises generating multiple different relationships between values of climb performance gradient and air temperature corresponding to different available engine power levels for the modified aircraft; and where the method further comprises performing the following steps prior to flying the mission:

operating the modified aircraft during a pre-flight engine run-up to determine available engine power level of the modified aircraft;

then selecting the relationship between values of climb performance gradient and air temperature that corresponds to the available engine power level of the modified aircraft corresponding to the determined available engine power level of the modified aircraft; and then setting or changing at least one of engine torque or power during the mission takeoff climb or the gross aircraft weight during the mission takeoff according to the selected generated relationship between values of climb performance gradient and air temperature for the modified aircraft.

8. The method of claim 1, where the one or more aircraft engines are each turboprop engines.

9. The method of claim 1, further comprising using at least one programmed processing device to generate the relationship between rate of climb and aircraft engine power at multiple different altitudes for the modified aircraft based on the recorded flight test data, and to generate the relationship between values of climb performance gradient and air temperature for the modified aircraft at the multiple different altitudes.

10. The method of claim 9, further comprising using the at least one programmed processing device to:

read from non-volatile memory and convert data comprising a relationship between values of climb performance gradient and air temperature for an unmodified aircraft at multiple different altitudes to a relationship between rate of climb and aircraft engine power at multiple different altitudes for the unmodified aircraft;

read from the non-volatile memory the recorded flight test data for the modified aircraft, where the recorded flight test data comprises the measured rate of climb and the corresponding aircraft engine power at each of the multiple different flight conditions for the modified aircraft;

generate a relationship between rate of climb and aircraft engine power at different altitudes for the modified aircraft based on the measured rate of climb and corresponding aircraft engine power at each of multiple different flight conditions for the modified aircraft;

generate a relationship between values of climb performance gradient and air temperature for the modified aircraft at the multiple different altitudes from the generated relationship between rate of climb and aircraft engine power at different altitudes for the modified aircraft; and output the generated relationship between values of climb performance gradient and air temperature for the modified aircraft at the multiple different altitudes to at least one of a display device, the non-volatile memory or to a hard copy format.

11. The method of claim 10, further comprising using the at least one programmed processing device to generate the relationship of rate of climb to aircraft engine power at different altitudes for the modified aircraft by modifying the relationship of rate of climb to aircraft engine power at different altitudes for the unmodified version of the same type of aircraft based on the recorded flight test data for the modified aircraft.

12. The method of claim 11, further comprising using the at least one programmed processing device disposed on the modified aircraft to perform the following while the modified aircraft is flying a mission:

accept input via one or more devices from a user, the user input comprising flight conditions that include at least one of altitude, air temperature, aircraft weight, engine torque or power, aircraft drag, and headwinds or tailwinds for a given climb segment of the modified aircraft during a flight mission; and respond to the user input by outputting to the display device the generated relationship between values of climb performance gradient and air temperature for the modified aircraft at one or more altitudes and/or flight conditions of the climb segment.

13. The method of claim 12, further comprising then operating the modified aircraft by taking off and flying the modified aircraft; and using the output generated relationship between values of climb performance gradient and air temperature to set or change engine torque or power of the modified aircraft during a climb while taking off the modified aircraft and/or by setting or changing gross aircraft weight of the modified aircraft while taking off the modified aircraft.

14. The method of claim 10, further comprising then operating the modified aircraft by taking off and flying the modified aircraft; and using the output generated relationship between values of climb performance gradient and air temperature to set or change engine torque or power of the modified aircraft during a climb while taking off the modified aircraft and/or by setting or changing gross aircraft weight of the modified aircraft while taking off the modified aircraft.

15. The method of claim 1, further comprising modifying an unmodified fixed wing aircraft to provide the modified fixed wing aircraft prior to the step of flight testing the modified fixed wing aircraft.

16. A system, comprising:

non-volatile memory storing:

data comprising a relationship between values of climb performance gradient and air temperature for an unmodified fixed wing aircraft at multiple different altitudes, and data comprising measured rate of climb and corresponding aircraft engine power at each of multiple different flight conditions for a modified aircraft, where the modified aircraft is a modified version of the unmodified aircraft and where the flight conditions comprises at least one of multiple different gross weights, multiple different operating altitudes, multiple different operating air temperatures, or combinations thereof;

at least one processing device coupled to the non-volatile memory and programmed to:

read from the non-volatile memory and convert the data comprising the relationship between values of climb performance gradient and air temperature for the unmodified aircraft at multiple different altitudes to a relationship between rate of climb and aircraft engine power at multiple different altitudes for the unmodified aircraft;

read from the non-volatile memory the data comprising measured rate of climb and corresponding aircraft engine power at each of multiple different flight conditions for the modified aircraft;

generate a relationship between rate of climb and aircraft engine power at different altitudes for the modified aircraft based on the measured rate of climb and corresponding aircraft engine power at each of multiple different flight conditions for the modified aircraft;

generate a relationship between values of climb performance gradient and air temperature to operate the modified aircraft at the multiple different altitudes from the generated relationship between rate of climb and aircraft engine power at different altitudes for the modified aircraft; and output the generated relationship between values of climb performance gradient and air temperature for the modified aircraft at the multiple different altitudes to at least one of a display device, the non-volatile memory or to a hard copy format.

17. The system of claim 16, where the at least one processing device is further programmed to generate the relationship of rate of climb to aircraft engine power at different altitudes for the modified aircraft by modifying the relationship between rate of climb and aircraft engine power at different altitudes for the unmodified version of the same type of aircraft based on the measured rate of climb and corresponding aircraft engine power at each of multiple different flight conditions for the modified aircraft.

18. The system of claim 16, where the measured rate of climb and corresponding aircraft engine power at each of multiple different flight conditions for the modified aircraft comprises flight test data recorded during flight testing of the modified aircraft.

19. The system of claim 16, where the modified aircraft comprises modifications made to an unmodified version of the same type of aircraft, the modifications comprising structures that affect external air flow across the structure of the modified aircraft and/or affect engine power of the modified aircraft.

20. The system of claim 19, where the modifications to the unmodified aircraft comprise at least one of external payload attachment features, external payload components, external fairings or a combination thereof.

21. The system of claim 16, further comprising the display device and one or more devices coupled to the at least one processing device; where the at least one processing device comprises a central processing unit (CPU); where the at least one processing device, display device and non-volatile memory comprise part of an avionics component or a portable computer system; and where the at least one processing device is programmed to accept input via the one or more devices from a user and output the generated relationship between values of climb performance gradient and air temperature for the modified aircraft at one or more of the multiple different altitudes to the display device.

22. The system of claim 17, where the user input via the one or more devices comprises flight conditions that include at least one of altitude, air temperature, aircraft weight, engine torque or power, aircraft drag, and headwinds or tailwinds for a given climb segment of the modified aircraft during a flight mission; and where the at least one processing devices is programmed to respond to the user input by displaying values of climb performance gradient and air temperature for the modified aircraft at one or more altitudes and/or flight conditions of the climb segment.

23. The system of claim 21, where the modified aircraft comprises modifications made to an unmodified version of the same type of aircraft; and where the system further comprises the modified aircraft, one or more aircraft engines and the modifications made to the unmodified version of the same type of aircraft; and where the modifications to the unmodified aircraft comprise structures that affect external air flow across the structure of the modified aircraft and/or affect engine power of the modified aircraft.

24. The system of claim 23, where the modifications made to the unmodified version of the same type of aircraft comprise at least one of external payload attachment features, external payload components, external fairings or a combination thereof.

25. The system of claim 23, where the one or more aircraft engines are each turboprop engines.

* * * * *